2,960,446

PROCESS FOR PREPARING HYDROXYBENZ-IMIDAZOLE BY FERMENTATION

Ian M. Miller, Roselle Park, N.J., assignor to Merck & Co., Inc., Rahway, N.J., a corporation of New Jersey No Drawing. Filed July 8, 1955, Ser. No. 520,907

5 Claims. (Cl. 195—114)

This invention relates to the production of therapeutically and nutritionally valuable substances by fermentation, and particularly to the production of hydroxybenzimidazole analogues of cobalamines having LLD activity or growth promoting activity for the microorganism *Lactobacillus lactis* Dorner.

By the term "hydroxybenzimidazole analogues of cobalamines" is meant cobalamines in which the 5,6-dimethylbenzimidazole moiety of the cobalamines is replaced by 5-hydroxybenzimidazole. Examples of such compounds that might be mentioned are the hydroxybenzimidazole analog of cyano-cobalamin (this product corresponding to vitamin $B_{12}$ in which the 5,6-dimethylbenzimidazole moiety is replaced by 5-hydroxybenzimidazole), hydroxybenzimidazole analog of hydroxo-cobalamine, hydroxybenzimidazole analog of chlorocobalamine, and the like.

Vitamin $B_{12}$ is produced by fermentation of nutrient mediums by selected strains of various species of subphylum fungi and particularly by the Schizomycetes. The potency of broths resulting from the fermentation of the usual nutrient mediums by such organisms, however, is small in comparison with the potency of the pure vitamin. Such broths vary in their vitamin $B_{12}$ activity, depending on the species of fungus employed, but ordinarily contain a vitamin $B_{12}$ content of the order of 0.00003 mg. per ml. Recently it has been discovered that the addition of sources of cobalt and cyanide to the fermentation medium results in an excellent increase in yield of vitamin $B_{12}$, depending upon the microorganism, to a vitamin $B_{12}$ content of the order of 0.0006 mg. per ml. Other methods have been suggested for increasing the yield of vitamin $B_{12}$ which have met with varying degrees of success. The amount of recoverable vitamin $B_{12}$ still remains small.

The low yield of vitamin $B_{12}$ has the effect that the cost of the beneficial vitamin remains high. This economic problem has resulted in intensive research in two directions. One direction is the further development of strains of microorganisms, fermentation mediums and processes, and recovery procedures for increasing the yield of vitamin $B_{12}$. The second direction of research has been the search for other compounds which possess activity similar to vitamin $B_{12}$. This research has resulted in the production of various analogues of vitamin $B_{12}$, but generally they are produced by chemical conversion from vitamin $B_{12}$ or related substances. The desirability of being able to produce other compounds having activity similar to vitamin $B_{12}$ directly by a fermentation process is readily apparent.

An object of the invention is to provide a process for producing hydroxybenzimidazole analogues of cobalamines having LLD activity. Another object is to produce such compounds by fermentation processes. Other objects and the advantages of the invention will appear hereinafter.

In accordance with the invention hydroxybenzimidazole analogues of cobalamines can be prepared wherein the 5,6-dimethylbenzimidazole moiety of the cobalamines is replaced by 5-hydroxybenzimidazole by propagating a LLD activity-producing strain of microorganism in a nutrient medium containing a 3,4-diaminophenol compound. The cultivation of these microorganisms in the presence of the 3,4-diaminophenol compound results in the formation of the hydroxybenzimidazole analogues of cobalamines as well as vitamin $B_{12}$ itself. The final broth has LLD and APF activity resulting from the combination of both the vitamin $B_{12}$ and the unnatural analogue.

The 3,4-diaminophenol compound has the general formula—

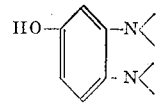

Typical of the compounds embraced in this group are compounds having the formulae:

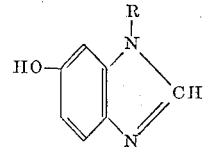

and

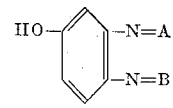

wherein R is hydrogen or a polyhydroxyalkyl or acyl group and A and B are hydrogen, or a group removable by hydrolysis or a carbon-free reducible group, and can be the same or different groups, and can also be linked together to form a ring structure. The acyl group is preferably one having the formula—

wherein R' is an alkyl, aralkyl or aryl group having a chain length of from one to eight carbon atoms. The polyhydroxyalkyl group is preferably a glycoside having a five or six membered ring such as methyl D-glucoside; D-fructoside; 1-α-D-ribofuranosido-5-hydroxybenzimidazole; 1-α-D-ribopyranosido-5-hydroxybenzimidazole; 1-L-arabinopyranoside-5-hydroxybenzimidazole; 1-L-xylopyranosido-5-hydroxybenzimidazole and 1-β-D-ribopyranoside - 5 - hydroxybenzimidazole. Typical examples of groups removable by hydrolysis are acyl groups such as those defined above. The nitro and nitroso groups are typical of suitable reducible groups. Examples of such compounds are 5-hydroxybenzimidazole; N-acetyl-5-hydroxybenzimidazole; 3,4-diaminophenol; 3-amino-4-nitrophenol; N,N'-diacetyl-3,4-diaminophenol; 3-amino-4-nitrosophenol; N-acetyl-5-hydroxybenzimidazole and N-(D-glucosido)-5-hydroxybenzimidazole; or acid salts therefor such as the hydrochloride, hydrobromide and sulfate. The quantity of the 3,4-diaminophenol compound present during the fermentation can vary widely depending upon the medium used, but it is ordinarily preferred to use about 1 to 2000γ per milliliter of medium or more desirably from about 400 to 800γ per milliliter of medium. The quantity of 3,4-diaminophenol compound used can all be added to the fermentation medium at one time or the addition can be continuous during the fermentation period.

In a preferred embodiment of the invention even greater yields are obtained by adding to the fermentation medium substantially pure betaine. The betaine is preferably present in from about 0.1 to about 4% by weight based on the weight of the nutrient medium. The amount of pure betaine required will be reduced in proportion to the amount of beet molasses present in the medium (although beet molasses should not be present in excess of about 12.5% of the fermentation medium), but not to an extent of below 0.1% by weight and not above a total percent of betaine, including the amount of betaine present in the beet molasses, of approximately 4% by weight. Amounts of betaine in excess of about 4% by weight of the fermentation medium appear to cause no further increase in the yield of LLD active substances. By the term substantially pure betaine is meant betaine which is not contaminated by the undesirable substances commonly contained in beet molasses. Such substances are for example inorganic salts and particularly chlorides.

The usual nutrients include a source of carbon, nitrogen, inorganic salts and growth factors when required. The carbon may be provided by a carbohydrate such as dextrose, maltose, xylose, invert sugar, corn syrup, beet molasses and the like. The nitrogen can be provided by an ammonium salt, amino acids or proteins, such as soybeans, oats, yeast, yeast extracts, tryptic digest of casein, meat extract, blood meal, protein meal and bone scrap, salmon meals, fish meals, fish solubles, distillers solubles and the like. If desired, the microorganism may be propagated using proteins or amino acids without any carbohydrate being present in the medium, in which case the proteins or amino acid may serve as a source of both the carbon and the nitrogen required by the microorganism. The addition of cobalt in any suitable form is also customary to obtain high yields of cobalamine.

The LLD activity producing microorganism in fungi as outlined on page 2 of the book "Introduction to Industrial Mycology," by Smith and Raistrick, London, Edward Arnold & Co. (1938), that is the Myxomycetes, Schizomycetes and Eumycetes. It is ordinarily preferred to employ selected strains of microorganisms belonging to the Schizomycetes, particularly certain strains of the genus Bacillus, the genus Streptomyces, the genus Alcaligenes, the genus Pseudomonas, the genus Mycobacterium, and the genus Escherichia. The preferred Eumycetes includes strains of the genus Torula, the genus Eremothecium, and the genus Alternaria. It is preferred to utilize strains of fungi selected from the following species, namely: *Streptomyces griseus, Streptomyces albidoflavus, Streptomyces colombiensis, Streptomyces roseochromogenus, Streptomyces antibioticus, Streptomyces fradiae, Streptomyces venezulae, Alcaligenes faecalis, Pseudomonas aeruginosa, Pseudomonas fluorescens, Pseudomonas mildenbergii, Pseudomonas mucidolens, Pseudomonas lumichroma, Pseudomonas denitrificens, Pseudomonas chloraraphis, Mycobacterium smegmatis, Pseudomonas rugosa, Pseudomonas nigrificans, Pseudomonas salinaria,* and *Alternaria alevaeca.*

The medium is sterilized and the sterile medium containing the desired amount of cobalt is inoculated with a culture of the selected microorganism and the mixture is incubated until the optimum LLD activity is attained. The fermentation is ordinarily conducted for a period of about two to seven days, although shorter or longer times can be employed if desired. The incubation is usually carried out under aerated submerged conditions and at a temperature appropriate for the specific microorganism employed.

The unnatural analogue of vitamin $B_{12}$ is found to be contained in the cells in the microorganism and can be recovered from these cells by a number of procedures. Thus, the cells can be removed from the fermentation broth by centrifugation suspended in a suitable amount of water and steamed in an autoclave for thirty minutes for sufficient time to free the LLD-active material from the cellular suspension. The supernatant liquor containing the LLD-active material can then be separated from the cellular debris and treated further to recover the active components. In one method of recovering the LLD-active substance, the solid obtained by drying the separated supernatant liquor is dissolved in a small amount of water and separated by paper chromatography, using as the developing solvent a solution obtained by mixing 100 parts of secondary butanol, 50 parts of water and 0.25 part of 1% solution of sodium cyanide, and discarding the aqueous phase. The hydroxybenzimidazole analogs of cobalamines can then be isolated and recovered from the paper chromatogram.

The LLD-active material can also be isolated from the fermentation mixture in crystalline form, if desired, by filtering the fermentation broth and treating the filtered broth with activated charcoal thereby adsorbing the active material. The activated charcoal is eluted with an aqueous solution of pyridine or α-picoline and the resulting eluate is evaporated to dryness. The solid concentrate is extracted with a lower aliphatic alcohol, such as methyl alcohol, and the alcoholic extract is passed through a column packed with activated alumina whereby the active material is adsorbed by the alumina. The column is then developed with fresh lower aliphatic alcohol solvent and those fractions of the eluate which show LLD-activity (as determined by microbiological assay) are combined and the combined eluates are concentrated. The concentrated alcoholic solution is then mixed with a liquid miscible with said solution and in which the active substance is insoluble, such as acetone. The precipitate which forms may be further purified by reprecipitation from alcohol by the addition of acetone and the product purified by crystallization from water by the addition of acetone to produce crystalline vitamin $B_{12}$.

The following examples are given for purposes of illustration:

The fermentation mediums listed in Table A were used in the example—

TABLE A

| | 1, percent | 2, percent |
|---|---|---|
| Betaine | | 1 |
| Beet molasses | 4.5 | 6 |
| $(NH_4)_2HPO_4$ | 0.2 | 0.2 |
| $Na_2SO_4$ | 0.2 | 0.2 |
| KCl | 0.08 | 0.08 |
| $MgSO_4.7H_2O$ | 0.05 | 0.05 |
| $MnSO_4.4H_2O$ | 0.02 | 0.02 |
| $ZnSO_4.7H_2O$ | 0.002 | 0.002 |
| $FeSO_4.7H_2O$ | 0.002 | 0.002 |
| $Co(NO_3)_2.6H_2O$ | 0.0005 | 0.004 |
| pH | 7–7.2 | 7–7.2 |

Example 1

The organism *Pseudomonas denitrificans* was transferred weekly on slants of medium 1 containing 2% agar and stored in the cold room between transfers. Inoculum for the experiment was brought up in medium No. 1 (40 ml./200 ml. Erlenmeyer flask) by incubating for 24 hours on a shaker at 28° C. Medium No. 2 was dispersed at the rate of 40 ml. per 250 Erlenmeyer flask and varying amounts of an alcoholic solution of 5-hydroxybenzimidazole hydrogen bromide were added. After sterilization at 10 pounds of pressure (120° C.) for 20 minutes the flasks were inoculated each with 2 ml. of the medium No. 1 culture. The flasks are then incubated for four days on the shaker at 28° C. After incubation aliquots of the broths were adjusted to pH 5, sodium cyanide added to give a concentration of 0.01% steamed for thirty minutes in the autoclave, diluted in pH 5 phosphate buffer (.04 M) and assayed for activity by *Lactobacillus lactis* Dorner using the cup plate method. The remaining portions of the broths were centrifuged to remove the cells and the cells were suspended in an amount of water equal to about half the volume of the original medium.

The cell suspensions were adjusted to pH 5, sodium cyanide added to give a concentration of 0.01% and steamed in the autoclave for thirty minutes. After cooling the cell debris, the debris was removed by centrifugation and aliquots of the extracts spotted out on Whatman No. 1 filter paper. The strips were chromatographed in a sec-butanol-water-cyanide system and developed by bioautography using both *Lactobacillus lactis* Dorner and *Escherichia coli* 113-3.

| Flask | 5-hydroxy benzimidazole hydrogen bromide γ/ml. | Total LLD Activity γ/ml. |
|---|---|---|
| 1 | 10 | 5.9 |
| 2 | 25 | 5.1 |
| 3 | 50 | 5.3 |
| 4 | 100 | 4.5 |
| 5 | 200 | 4.6 |

The hydroxybenzimidazole analogues of cobalamine wherein the 5,6-dimethylbenzimidazole moiety of the vitamin $B_{12}$ is replaced by a 5-hydroxybenzimidazole or 6-hydroxybenzimidazole moiety were detected on both the LLD and *E. coli* bioautographs. Vitamin $B_{12}$ was present in all flasks as detected on both the LLD and *E. coli* plates.

Example 2

An experiment was carried out to determine the relative amount of vitamin $B_{12}$ and hydroxybenzimidazole analogs obtained. The procedure in Example 1 was followed except that the broth 0.01 ml. after treatment with cyanide was spotted on Whatman No. 1 filter paper. 0.01 ml. amounts of diluent of the treated broth were also spotted. On the same sheet of filter paper known amounts of vitamin $B_{12}$ were also spotted (0.01 ml. each of solutions containing 2, 1, 0.5 and 0.1γ per milliliter of $B_{12}$). By comparing the size of the $B_{12}$ spots of the broth to the size of the spots made by the $B_{12}$ solution estimates can be made of the amount of total LLD activity contributed by vitamin $B_{12}$. Only two main bioactive materials were detected, $B_{12}$ and hydroxybenzimidazole analogs and therefore the difference in activity can be ascribed to the analog. The results are as follows:

| Flask | 5-hydroxy benzimidazole bromide added, γ/ml. | Total LLD Activity, γ/ml. | Estimate of $B_{12}$ Activity, γ/ml. |
|---|---|---|---|
| 1 | 0 | 5.8 | 5-10 |
| 2 | 10 | 5.1 | 5-10 |
| 3 | 100 | 5.5 | 2.5-5 |
| 4 | 400 | 6.0 | 0.5-1 |
| 5 | 800 | 1.2 | 0.5-1 |

Some amounts of the analogs were detected in all flasks except No. 1.

Example 3

Following the procedure of Example 1 a fermentation was carried out with similar results by replacing medium No. 2 with the following medium:

| | Percent |
|---|---|
| L-glutamic acid | 1.0 |
| Betaine $H_2O$ | 1.0 |
| $(NH_4)_2HPO_4$ | 0.2 |
| $Na_2SO_4$ | 0.2 |
| KCl | 0.08 |
| $MgSO_4.7H_2O$ | 0.05 |
| $MnSO_4.4H_2O$ | 0.02 |
| $ZnSO_4.7H_2O$ | 0.002 |
| $FeSO_4.7H_2O$ | 0.002 |
| Cobalt nitrate-$6H_2O$ | 0.004 |

Any departure from the above description which conforms to the present invention is intended to be included within the scope of the claims.

What is claimed is:

1. A process for producing hydroxybenzimidazole analogs of cobalamines having LLD activity, which comprises fermenting a nutrient medium consisting essentially of water, inorganic salts, nutrient sources of carbon and nitrogen, and a 3,4-diaminophenol compound by means of a LLD activity-producing strain of microorganism of the genus Pseudomonas.

2. The process of claim 1 wherein the microorganism is *Pseudomonas denitrificens*.

3. The process of claim 1 wherein the 3,4-diaminophenol compound is 5-hydroxybenzimidazole.

4. A process for producing the 5-hydroxybenzimidazole analog of cobalamine which comprises propagating *Pseudomonas denitrificens* in a nutrient medium consisting essentially of water, inorganic salts, nutrient sources of carbon and nitrogen and 5-hydroxybenzimidazole.

5. A process for producing hydroxybenzimidazole analogs of cobalamines having LLD activity, which comprises fermenting a nutrient medium consisting essentially of water, inorganic salts, nutrient sources of carbon and nitrogen, and a 3,4-diaminophenol compound by means of a LLD activity-producing strain of microorganism of the genus Pseudomonas and recovering the hydroxybenzimidazole analog from the fermented medium.

References Cited in the file of this patent

UNITED STATES PATENTS

| 2,566,123 | De Rose | Aug. 28, 1951 |
| 2,576,932 | Garibaldi | Dec. 4, 1951 |
| 2,579,679 | Leffler | Dec. 25, 1951 |
| 2,715,602 | Hargrove | Aug. 16, 1955 |

OTHER REFERENCES

Bernhauer: Angewandte Chemie, vol. 66, No. 24, December 1954, pp. 776–780.